No. 690,311. Patented Dec. 31, 1901.
V. J. McDONNELL.
VISE.
(Application filed Aug. 17, 1901.)
(No Model.)
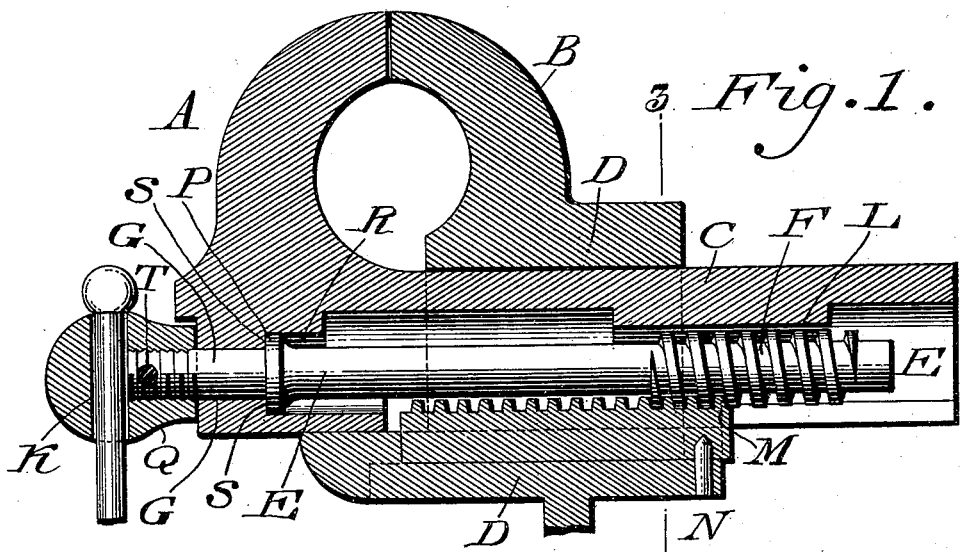
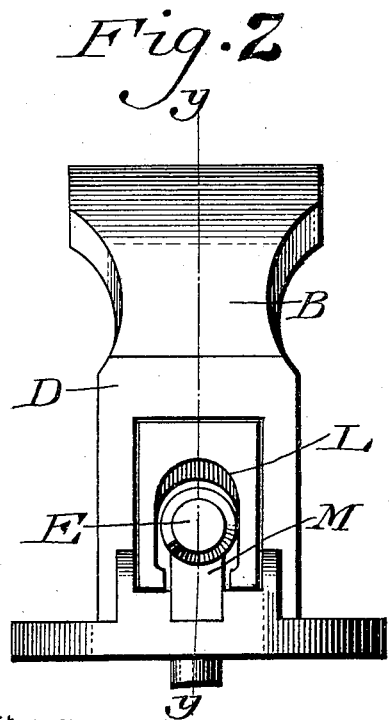
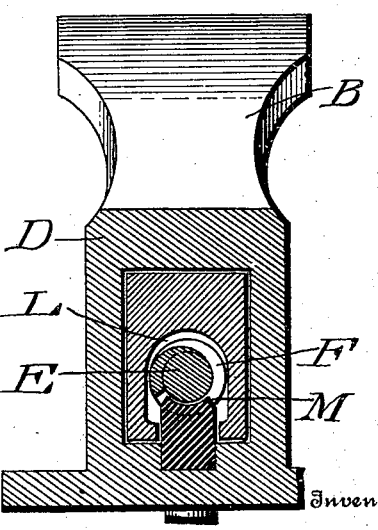
Witnesses
O. F. Nagle
L. Douville.
Inventor
Vincent J. McDonnell.
By Diederhauer & Fairbank
Attorneys

United States Patent Office.

VINCENT J. McDONNELL, OF PHILADELPHIA, PENNSYLVANIA.

VISE.

SPECIFICATION forming part of Letters Patent No. 690,311, dated December 31, 1901.

Application filed August 17, 1901. Serial No. 72,333. (No model.)

*To all whom it may concern:*

Be it known that I, VINCENT J. MCDONNELL, a citizen of the United States, residing in the city and county of Philadelphia, State of Pennsylvania, have invented a new and useful Improvement in Vises, of which the following is a specification.

My invention consists of a vise having a screw mounted on one of the jaws thereof, an unthreaded portion in the shank of said jaw, and a rack on the other jaw, said screw meshing with said rack and being held in engagement therewith by means of said unthreaded portion.

Figure 1 represents a longitudinal section on line $y\,y$, Fig. 2, of a vise embodying my invention. Fig. 2 represents a rear end view of a portion thereof. Fig. 3 represents a longitudinal section on line $z\,z$, Fig. 1.

Similar letters of reference indicate corresponding parts in the figures.

Referring to the drawings, A designates the movable jaw of the vise, and B the stationary jaw thereof, said movable jaw A having the tubular shank C, which is passed through the tubular shank D of the stationary jaw.

E designates a shaft, which carries at its inner end the screw F and is located within the shank C. The forward end of said shaft has a journal portion or neck G, which is mounted within the base portion of the movable jaw A. On the outer end of said shaft is the head Q with an opening K for the handle of the device, whereby the screw-shaft E may be rotated. On the inner face of the shank C is a lug L, whose inner face is circular or segmental in cross-section and unthreaded, said lug having the periphery of the threads of the screw F bearing against and consequently adapted to contact with said face. On the inner face of the base of the shank D is the rack M, whose teeth are sections of a screw-thread with which the screw F engages, said rack having said screw held in engagement therewith by said lug L and being fitted in said shank by means of a joint, which permits of its application to or removal from its bed in the shank D and laterally retains the same securely in position during operation, it being prevented from being improperly withdrawn in longitudinal direction by means of the screw N, which is passed through the shank D and enters said rack. As the screw F engages with the teeth of the rack M and as the periphery of its convolutions rides on the unthreaded seat formed by the inner face of the lug L, said screw is caused to rotate true and uniform and with less friction than heretofore, while being guarded from being strained, it being noticed that said screw F and its shaft E and the seat L with the shank C of the movable jaw move together while the jaws are being opened and closed without changing the position of the screw in relation to said seat.

It will be seen that when the screw-shaft is rotated as the rack M of the stationary jaw is engaged by the same the jaw A is moved from the jaw B, thus opening the vise, it being noticed that said screw-shaft and the tongues H follow the motion of the jaw A, it being evident that when the screw is rotated in reverse direction the vise will be closed. On the inner end of the neck or grooved portion G of the shank is the collar P, which is rotatable with said neck within the bore of the shank C, said collar bearing freely against the shoulder S about said bore.

The head Q bears freely against the exterior of the base of the jaw A about said bore R as a collar opposite to the collar P. By this provision the shaft E is swiveled in the jaw A at the base thereof.

The head Q is secured to the shaft E by means of the pin or screw T, which when removed permits the shaft when properly rotated to disconnect from the jaw A.

The vise as constructed will be found to be of inexpensive, simple, strong, and durable construction.

Having thus described my invention, what I claim as new, and desire to secure by Letters Patent, is—

1. In a vise, a screw mounted on one of the jaws thereof, an unthreaded portion in the shank of said jaw, and a rack on the other jaw, the threads of said screw meshing with said rack and being held in engagement therewith by said unthreaded portion.

2. In a vise, movable and stationary jaws, with hollow shanks, the latter being movably fitted respectively one within the other, a rotatable shaft, and a screw thereon within the shank of the movable jaw, means for swiveling said shaft on the movable jaw, a rack on the shank of the stationary jaw with which said screw meshes, and an unthreaded circular seat on the shank of the movable jaw with which said screw contacts and is thereby held in engagement with said rack.

VINCENT J. McDONNELL.

Witnesses:
 JOHN A. WIEDERSHEIM,
 WM. CANER WIEDERSHEIM.